United States Patent
Rogers et al.

(10) Patent No.: US 11,476,044 B2
(45) Date of Patent: Oct. 18, 2022

(54) ELECTRIFIED VEHICLE CABLE HAVING AN INDUCTOR PORTION

(71) Applicant: FORD GLOBAL TECHNOLOGIES, LLC, Dearborn, MI (US)

(72) Inventors: Craig Brian Rogers, Belleville, MI (US); Lihua Chen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2046 days.

(21) Appl. No.: 14/641,540

(22) Filed: Mar. 9, 2015

(65) Prior Publication Data
US 2016/0264005 A1 Sep. 15, 2016

(51) Int. Cl.
| | |
|---|---|
| *B60L 50/61* | (2019.01) |
| *H01F 37/00* | (2006.01) |
| *H01F 27/32* | (2006.01) |
| *H01F 27/08* | (2006.01) |
| *B60L 15/00* | (2006.01) |
| *B60L 50/16* | (2019.01) |
| *H01F 27/36* | (2006.01) |

(52) U.S. Cl.
CPC .......... *H01F 37/005* (2013.01); *B60L 15/007* (2013.01); *B60L 50/16* (2019.02); *B60L 50/61* (2019.02); *H01F 27/085* (2013.01); *H01F 27/325* (2013.01); *H01F 27/36* (2013.01); *H01F 27/363* (2020.08); *B60L 2210/10* (2013.01); *Y02T 10/62* (2013.01); *Y02T 10/64* (2013.01); *Y02T 10/70* (2013.01); *Y02T 10/7072* (2013.01); *Y02T 10/72* (2013.01)

(58) Field of Classification Search
CPC .............................. H01B 7/18; Y02T 10/7241
See application file for complete search history.

(56) References Cited

U.S. PATENT DOCUMENTS

| | | | |
|---|---|---|---|
| 5,839,554 A | 11/1998 | Clark | |
| 7,896,116 B2* | 3/2011 | Tatematsu | B60L 50/16 180/65.6 |
| 8,089,242 B2 | 1/2012 | Loudot | |
| 8,575,778 B2 | 11/2013 | Chen | |
| 2003/0164245 A1* | 9/2003 | Areskoug | H01F 27/16 174/110 R |
| 2005/0011687 A1* | 1/2005 | Yamaguchi | B60K 6/48 180/65.1 |
| 2010/0066166 A1* | 3/2010 | Yoshinaga | B60L 3/0046 307/9.1 |

(Continued)

FOREIGN PATENT DOCUMENTS

| | | |
|---|---|---|
| CN | 2546851 | 4/2003 |
| JP | 2008199850 A * | 8/2008 |

(Continued)

OTHER PUBLICATIONS

Hoffmann, Klaus F. and Jens Peter Kaerst, High Frequency Power Switch—Improved Performance by MOSFETs and IGBTs Connected in Parallel, Philips Medical Systems Business Unit GTT, Development, 2005, pp. 1-11, Hamburg, Germany.

*Primary Examiner* — Daniel Kessie
(74) *Attorney, Agent, or Firm* — David B. Kelley; Carlson, Gaskey & Olds, P.C.

(57) ABSTRACT

An exemplary electrified vehicle assembly includes a cable connected to an electrified vehicle battery. The cable has a coiled portion providing an inductor.

15 Claims, 3 Drawing Sheets

(56) References Cited

U.S. PATENT DOCUMENTS

| | | | |
|---|---|---|---|
| 2012/0235710 A1 | 9/2012 | Roessler et al. | |
| 2014/0034382 A1* | 2/2014 | Mateski | H02G 11/02 |
| | | | 174/74 R |
| 2015/0137751 A1* | 5/2015 | King | H02J 7/0042 |
| | | | 320/109 |
| 2015/0210171 A1* | 7/2015 | King | B60L 15/2045 |
| | | | 318/139 |
| 2017/0331400 A1* | 11/2017 | Saha | H02P 27/06 |

FOREIGN PATENT DOCUMENTS

| | | | | |
|---|---|---|---|---|
| JP | 2009024777 A | * | 2/2009 | F16L 11/10 |
| JP | 2008-K14427 | * | 11/2016 | H02M 7/47 |

\* cited by examiner

ELECTRIFIED VEHICLE CABLE HAVING
AN INDUCTOR PORTION

TECHNICAL FIELD

This disclosure relates to an inductor for an electrified vehicle and, more particularly, to using a portion of a cable as an inductor.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include all-electric vehicles, hybrid electric vehicles (HEVs), plug-in hybrid electric vehicles (PHEVs), fuel cell vehicles, and battery electric vehicles (BEVs).

In many electrified vehicles, power moves from a battery through cables to a DC to DC boost converter, and then to a DC link. The electric machines are powered through the DC link. Boost converters are also considered variable voltage converters in some examples. Boost converters can include a relatively large inductor, which can be costly and difficult to package.

SUMMARY

An electrified vehicle assembly according to an exemplary aspect of the present disclosure includes, among other things, a cable connected to an electrified vehicle battery. The cable has a coiled portion providing an inductor.

In a further non-limiting embodiment of the foregoing assembly, the assembly includes an inner sheath. The coiled portion is wound about the inner sheath.

In a further non-limiting embodiment of any of the foregoing assemblies, the assembly includes an outer sheath. The inner sheath and the coiled portion are received within the outer sheath.

In a further non-limiting embodiment of any of the foregoing assemblies, the assembly includes a power control system of an electrified vehicle powertrain. The cable electrically couples the battery to the power control system.

In a further non-limiting embodiment of any of the foregoing assemblies, the power control system includes a variable voltage controller.

In a further non-limiting embodiment of any of the foregoing assemblies, the variable voltage controller includes a silicon-carbide based switch.

In a further non-limiting embodiment of any of the foregoing assemblies, the silicon-carbide based switch comprises a metal-oxide-semiconductor field-effect transistor.

In a further non-limiting embodiment of any of the foregoing assemblies, the silicon-carbide based switch comprises an insulated-gate bipolar transistor.

In a further non-limiting embodiment of any of the foregoing assemblies, the coiled portion is received within a rocker of an electrified vehicle.

In a further non-limiting embodiment of any of the foregoing assemblies, the coiled portion includes from 40 to 240 individual coils.

In a further non-limiting embodiment of any of the foregoing assemblies, the coiled portion includes a plurality of individual coils that are spaced from 15 to 55 millimeters from each other.

A method of electrified vehicle power conversion according to an exemplary aspect of the present disclosure includes, among other things, communicating electric current between an electrified vehicle battery and a power control system with a cable, and resisting changes in the electric current using an inductor portion of the cable.

In a further non-limiting embodiment of the foregoing method, the method includes coiling the inductor portion about an inner sheath.

In a further non-limiting embodiment of any of the foregoing methods, the method includes positioning at least a portion of the inductor portion and at least a portion of the inner sheath within an outer sheath.

In a further non-limiting embodiment of any of the foregoing methods, the method includes positioning the inductor portion within a rocker.

In a further non-limiting embodiment of any of the foregoing methods, the method includes air-cooling the inductor portion.

In a further non-limiting embodiment of any of the foregoing methods, the method includes communicating power from the cable through at least one silicon-carbide switching device within the power control system.

In a further non-limiting embodiment of any of the foregoing methods, the power control system comprises a variable voltage converter.

In a further non-limiting embodiment of any of the foregoing methods, the power control system comprises an inverter.

In a further non-limiting embodiment of any of the foregoing methods, the electrified vehicle battery is positioned in a rear of an electrified vehicle, and the power conversion device is positioned in a forward portion of the electrified vehicle.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to using a portion of a cable as an inductor. The cable extends from a battery to an inverter, for example. A separate inductor within a power control system of an electrified vehicle will not be required if the cable is used as an inductor.

Figure 1:
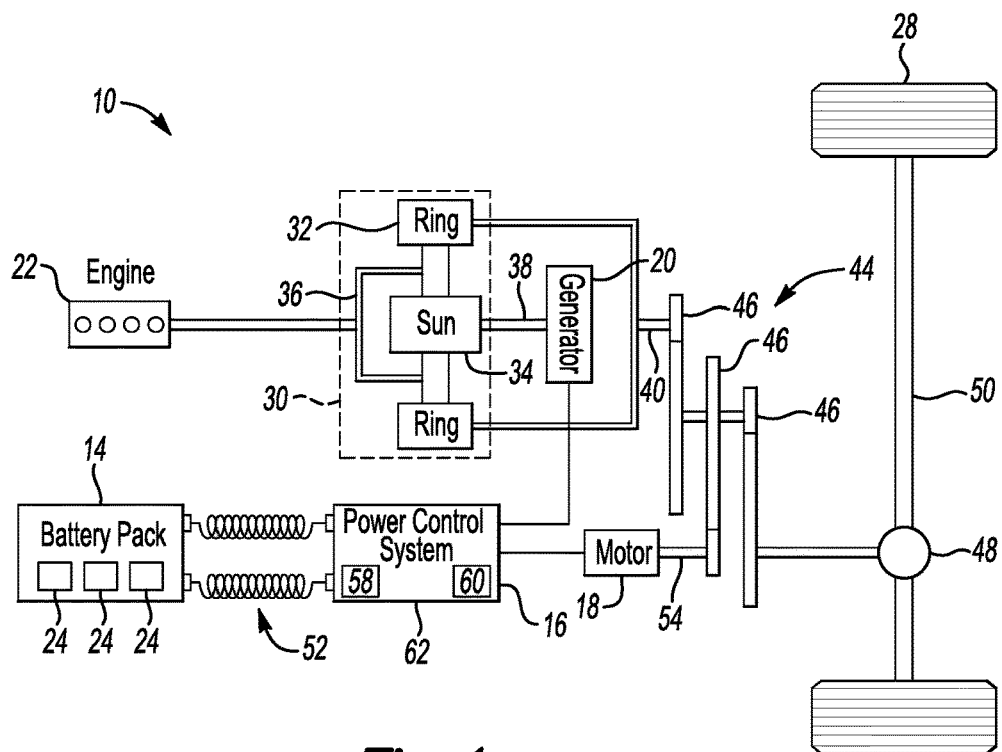
FIG. 1 shows a schematic view of an example powertrain for an electrified vehicle.

FIG. 1 schematically illustrates a powertrain 10 for a hybrid electric vehicle (HEV). The powertrain 10 includes a battery pack 14, a power control system 16, a motor 18, a generator 20, and an internal combustion engine 22. The battery pack 14 includes a plurality of arrays 24 of battery cells.

The motor 18 and generator 20 are types of electric machines. The motor 18 and generator 20 may be separate or may have the form of a combined motor-generator.

In this embodiment, the powertrain 10 is a power-split powertrain system that employs a first drive system and a second drive system. The first and second drive systems generate torque to drive one or more sets of vehicle drive wheels 28 of the electrified vehicle. The first drive system includes a combination of the engine 22 and the generator 20. The second drive system includes at least the motor 18, the generator 20, and the battery pack 14. The motor 18 and the generator 20 are portions of an electric drive system of the powertrain 10.

The engine 22, which is an internal combustion engine in this example, and the generator 20 may be connected through a power transfer unit 30, such as a planetary gear set. Of course, other types of power transfer units, including other gear sets and transmissions, can be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 22 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 18 can also be employed to drive the vehicle drive wheels 28 by outputting torque to a shaft 54 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery pack 14.

The example power control system 16, among other things, converts and controls power to and from the battery pack 14. The power control system 16 could convert and control power in other areas of the powertrain 10 in other examples.

The power control system 16 can modify the power from the battery pack 14 for use by the motor 18. The power control system 16 can modify power generated by the generator 20 for storage within the battery pack 14. The power control system 16 may, for example, convert DC to AC power, AC to DC power, limit or boost voltages, etc.

Cables 52 that extend between the battery pack 14 and the power control system 16 convey power between the battery pack 14 and the power control system 16. One of the cables 52 connects the battery pack 14 to a positive terminal of the power control system 16 and the other of the cables 52 connects the battery pack 14 to a negative terminal of the power control system 16.

The cables 52 provide at least some the inductance required by the power control system 16. In this example, the cables 52 produce essentially all of the inductance required by the power control system 16, and particularly a DC to DC converter of the power control system 16.

The required inductance can be achieved by winding or coiling a portion of the cable 52 between a positive terminal of the battery pack 14 and the power control system 16, a portion of the cable 52 between a negative terminal of the battery pack 14 and the power control system 16, or portions of both of the cables 52.

Figure 2:
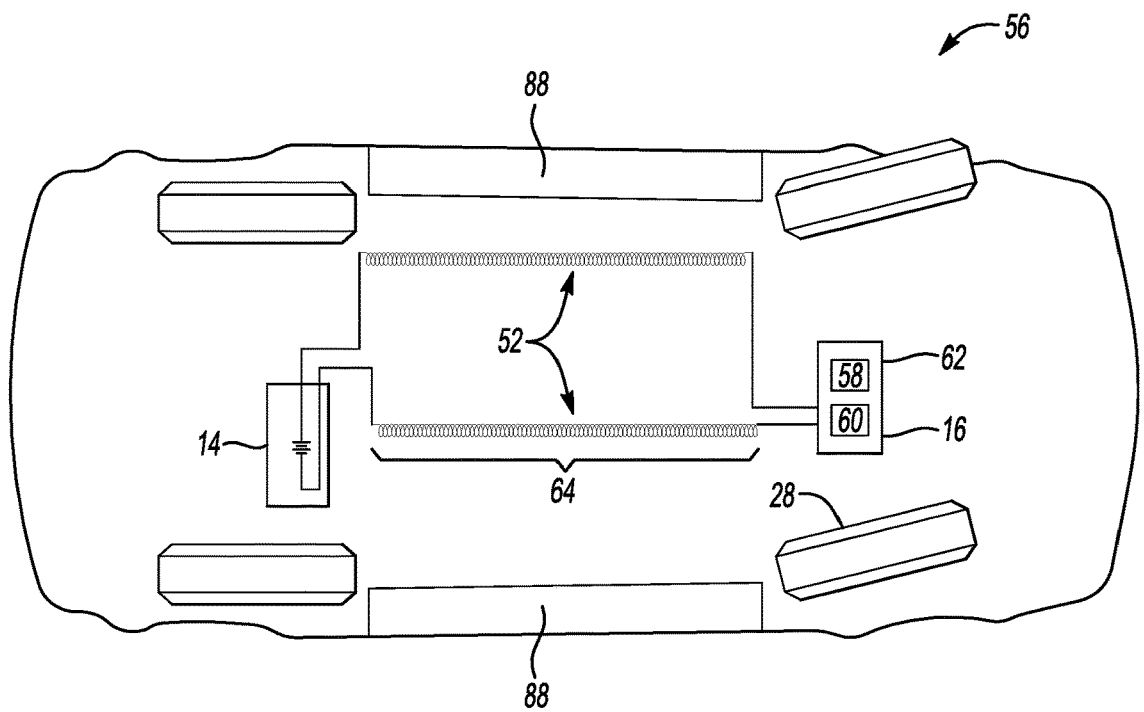
FIG. 2 shows a highly schematic view of selected portions of an electrified vehicle incorporating the powertrain of FIG. 1.
Figure 3:
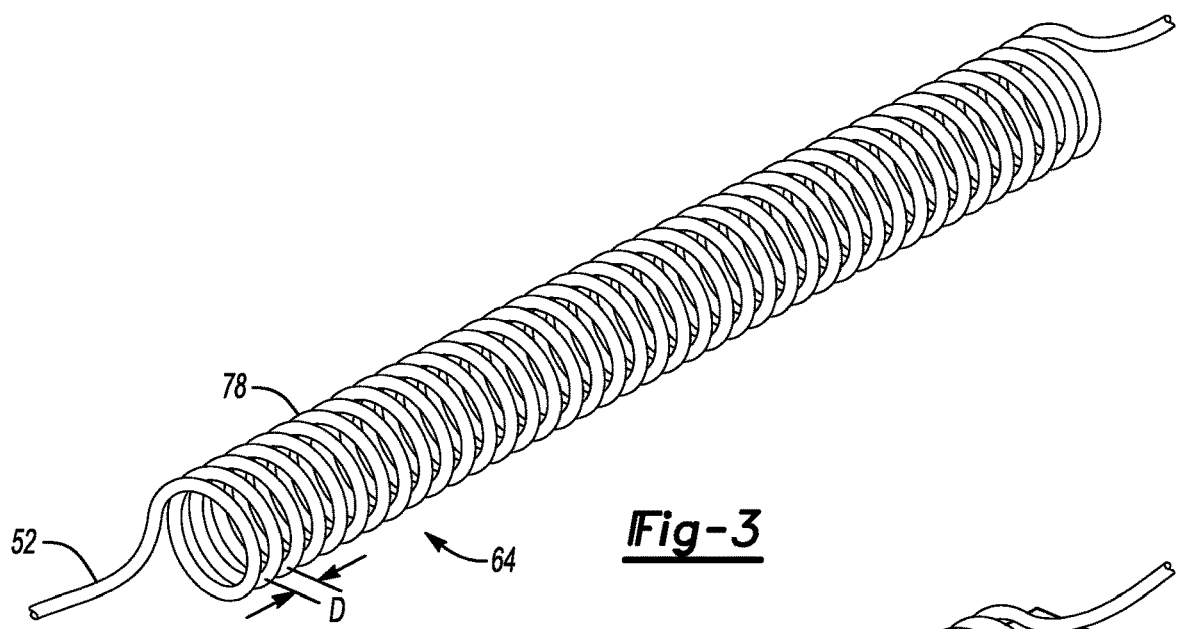
FIG. 3 shows a perspective view of a portion of a cable from the vehicle of FIG. 2.

Referring to FIG. 2 with continuing reference to FIG. 1, the powertrain 10 is used within a vehicle 56. The battery pack 14 is secured to an underside of the vehicle 56. The battery pack 14 is within a rear portion of the vehicle 56, vertically below a rear seat or trunk compartment, for example.

The power control system 16 comprises a variable voltage controller 58 and inverters or traction drives 60 in this example. The power control system 16 is positioned toward a forward portion of the vehicle 56 within, or adjacent to, an engine compartment, for example. The power control system 16 is held within a housing assembly 62.

The cables 52 extend from the battery pack 14 at the rear of the vehicle 56 to the power control system 16 at the front of the vehicle 56. The cables 52 are high-voltage cables relative to other cables on the vehicle 56, such as those used in connection with a 12-volt accessory battery.

The cables 52 each include an inductor portion 64. A length of the cables 52 is coiled to provide the inductor portion 64. Incorporating the inductor portion 64 in both the cables 52 allows the individual windings of the inductor portions 64 to achieve a desired inductance while being spaced further apart, which can facilitate air cooling of the inductor portions 64.

In other examples, only one of the cables 52 includes the inductor portion 64.

The cables 52, and specifically the inductor portion 64, are outside the housing assembly 62.

Referring now to FIGS. 3 to 7 with continuing reference to FIG. 2, the inductor portion 64 may be coiled about an inner sheath 68 and positioned within an outer sheath 72. The inner sheath 68 and the outer sheath 72 help to maintain the coiled configuration of the inductor portion 64. The outer sheath 72 also provides an electromagnetic interference shield in this example.

Figure 4:
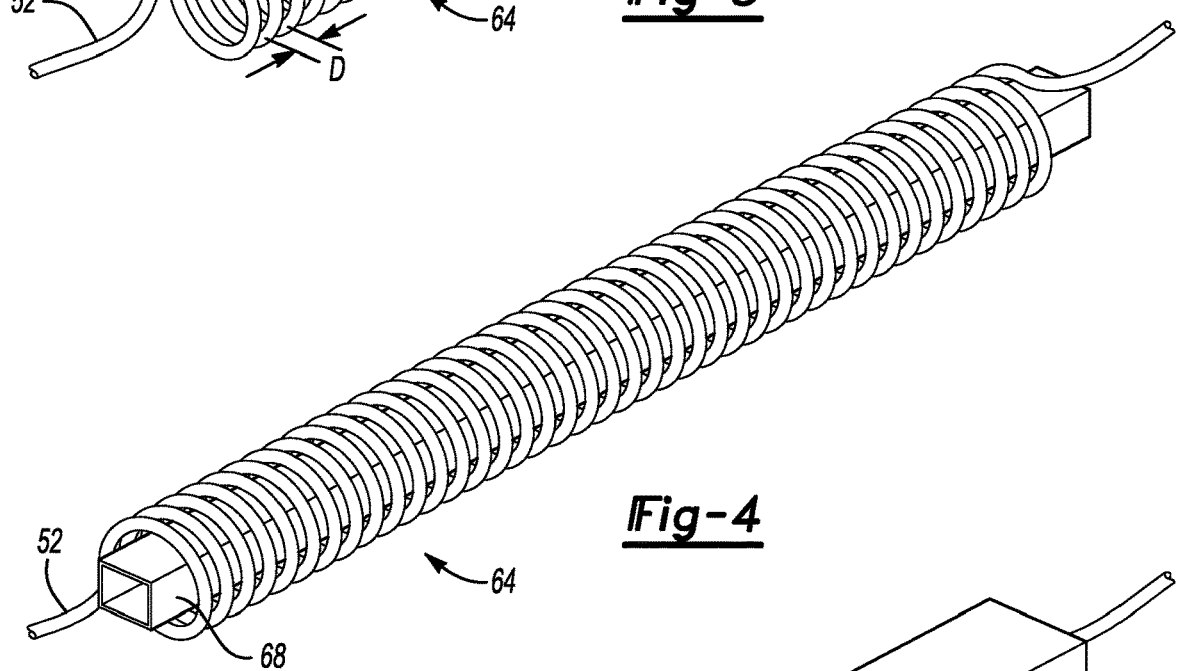
FIG. 4 shows the portion of FIG. 3 about an inner sheath.
Figure 5:
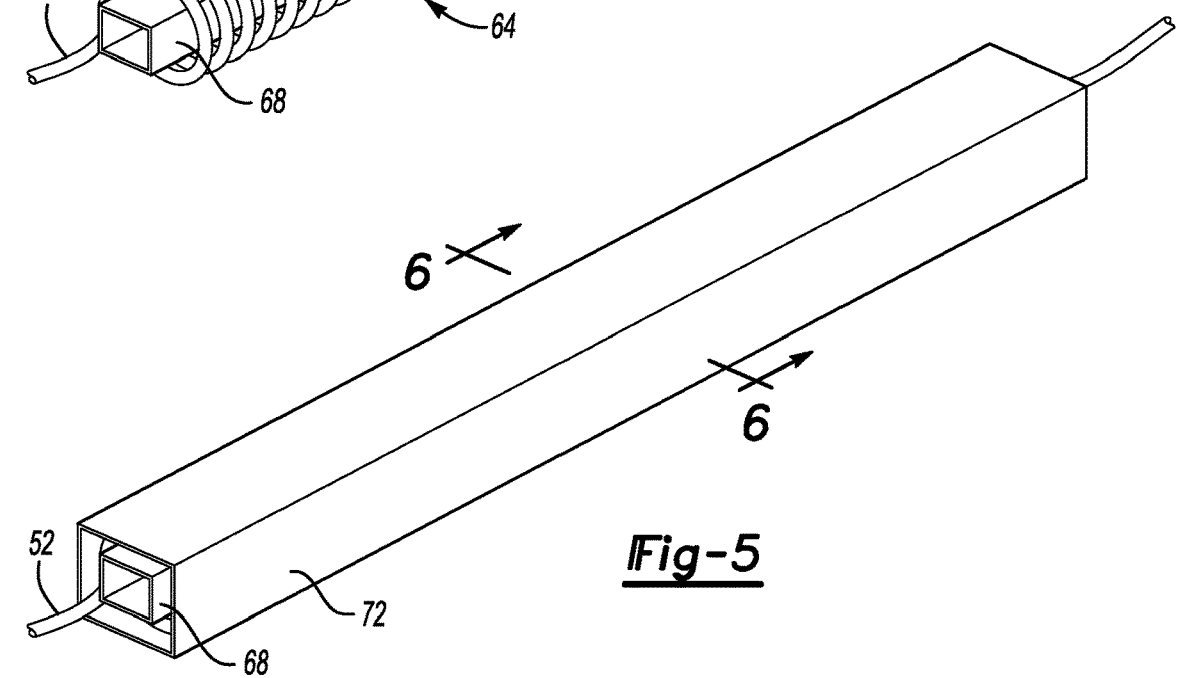
FIG. 5 shows the portion and the inner sheath of FIG. 4 within an outer sheath.
Figure 6:
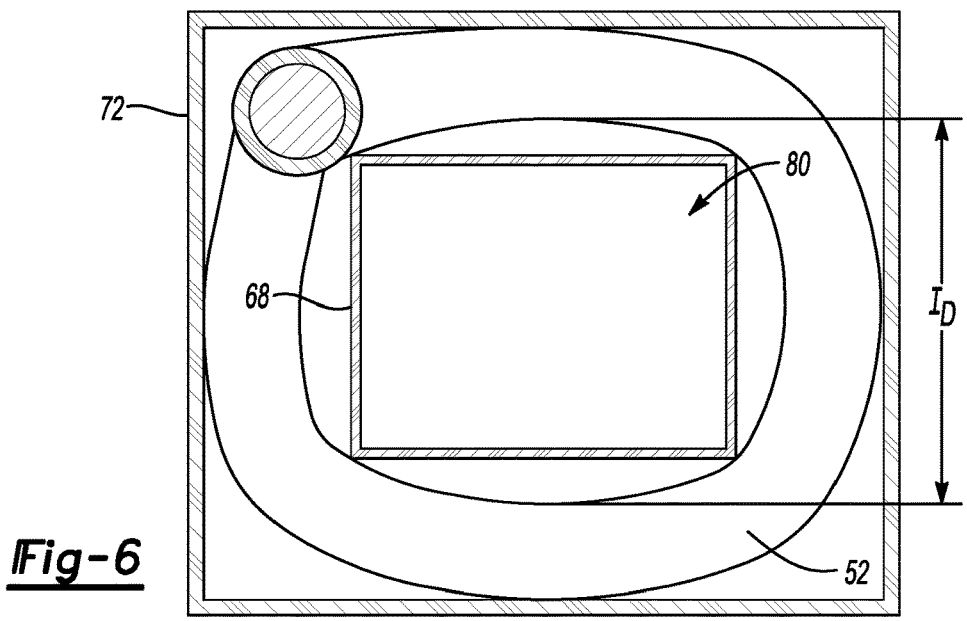
FIG. 6 shows a section view at line 6-6 in FIG. 5.
Figure 7:
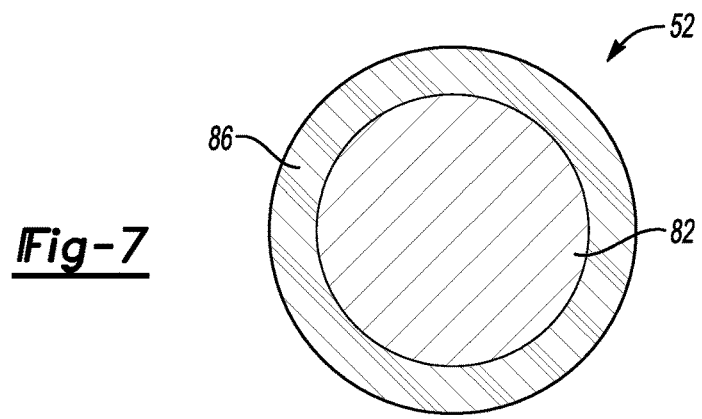
FIG. 7 shows a close-up section view of a cable in FIG. 6.

During assembly, the inductor portion 64 may be wound around the inner sheath 68 as shown in FIG. 4. The inductor portion 64 and inner sheath 68 are then positioned within the outer sheath 72. The inductor portion 64, the inner sheath 68 and the outer sheath 72 may be mounted to an underside of a floor of the vehicle 56.

The inductor portion 64 includes multiple individual coils 78, which form a coiled portion. The example inductor portion 64 includes about forty coils 78 (or windings or turns). In other examples, the inductor portion 64 can include from 40 to 240 individual coils.

The example cables 52 include a six-gauge conductive member 82, which is copper. The conductive member 82 is surrounded by an insulative layer 86, which may be a polymer material. Other gauges for the conductive member 82 may be used.

In some examples, the inductor portion 64 is not wound around the inner sheath 68, and the insulative layer 86, the conductive member 82, or both are able to retain the inductor portion 64 to have a coiled form.

The coils 78 of the inductor portion 64 are positioned a distance D from each other. The distance D is thirty-five millimeters in this example. In other examples, the distance D (i.e., spacing) between the coils 78 is from 15 to 55 millimeters. In this example, an inner diameter $I_D$ of the coils 78 is forty-eight millimeters. Such the inductor portion 64 has been shown to yield a total inductance of twenty microhenries.

The inductance provided by the inductor portion 64 is, as can be appreciated, proportional to the number of coils 78, the inner diameter $I_D$ of the coils 78, the distance D between the coils 78, and on the type of material that the coils 78 are wound around 68 or within 72.

The inner diameters $I_D$ of the coils 78 could be as small as bend tolerances for the cables 52 will permit, or can be as large as space permits. The larger the area within the coils, the greater the inductance.

Other examples may include more or fewer of the coils 78, different distances between the coils 78, and different inner diameters $I_D$ of the coils 78. For example, the distance D could range from 8 millimeters to 105 millimeters and could vary within the inductor portion 64. Further, the inner diameter $I_D$ of the coils 78 could range from 10 millimeters to 150 millimeters.

The inner diameters $I_D$ of the coils 78 and the distances D between the coils 78 could vary within one of the inductor portions 64.

Adjustments to the number of coils 78, distances between the coils 78, and inner diameters can provide different inductances.

The inner diameter $I_D$ can be controlled by resizing the inner sheath 68, the outer sheath 72, or both. Although the cross-section of the coils 78 is oval or circular in this example, other cross-sectional profiles could be used for, such as rectangular or square where the inductor portion 64 is wound more tightly around the inner sheath 68.

The inner sheath 68, the outer sheath 72, or both could have cross-sections that are nonrectangular, such as a circular or oval cross-sections. The cross-sections of the inner sheath 68 and outer sheath 72 can depend on a desired cross-sectional profile for the coils 78.

The inner sheath 68 and outer sheath 72 are a polymer material in this example. The sheaths may be metallic in other examples or may include a combination of metallic materials, polymer materials, or some other material.

The inner sheath 68 provides an open area 80. The coils 78 are wound around the open area 80, which acts as an air core of an inductor and may reduce saturation effects.

The example inductor portion 64 is relatively low-profile and is shielded.

The example inductor portion 64 is also air-cooled, as well as the remaining portions of the cables 52. Air to cool the inductor portion 64 can be communicated through the inner sheath 68.

In some examples, the inductor portion 64 of the cables 52 may be housed within a rocker 88 (FIG. 2) of the vehicle 56. That is, the rocker 88 could be the outer sheath 72. Rockers 88 are positioned at the laterally outboard sides of the vehicle 56 below the doors. Rockers 88 often include open areas suitable for receiving the inductor portion 64 wound around the inner sheath 68 as shown in FIG. 4, or the inductor portion 64 wound around the inner sheath 68 and housed within an outer sheath 72.

The rockers 88 are typically metallic and may provide advantageous enhancements to the inductance provided by the inductor portion 64 and also provide shielding to reduce electromagnetic interference.

Figure 8:
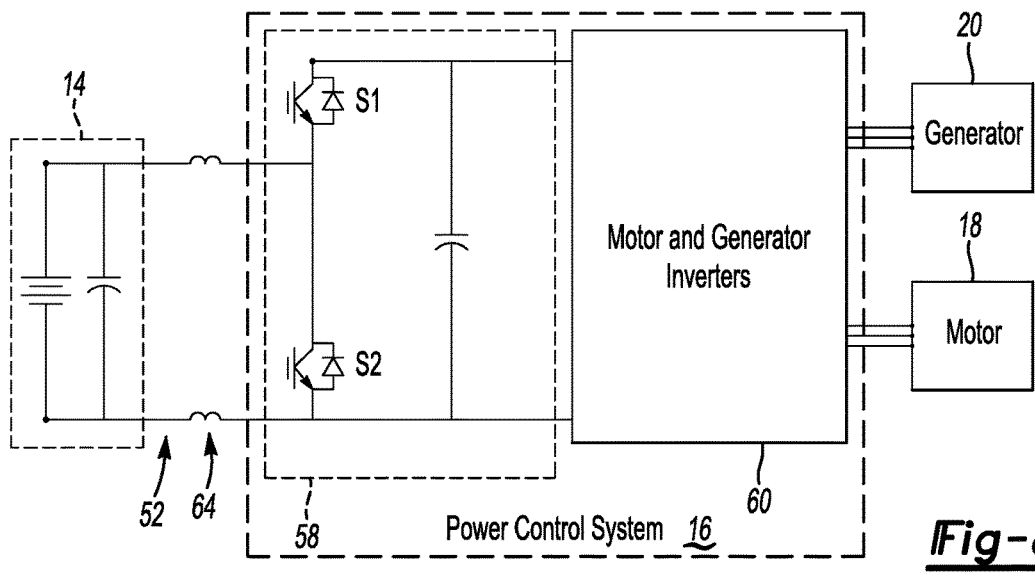
FIG. 8 shows a highly schematic view of selected electrical connections within the powertrain of FIG. 1.

Referring now to FIG. 8 with continuing reference to FIG. 2, the example variable voltage controller includes switching devices, S1 and S2. Example switching devices S1 and S2 are wide band gap switching devices and could include metal-oxide-semiconductor field-effect transistors ("MOSFETs") or insulated-gate bipolar transistor ("IGBTs").

In this example, the switching devices S1 and S2 are silicon-carbide based switching devices that switch at one-hundred kilohertz. The switching devices S1 and S2, when utilized in connection with the example inductor portion 64 have been found to provide a current ripple that mimics the current ripple found in other designs utilizing an inductor within the variable voltage controller rather than the inductor portion 64 of the cable 52. Again, the inductor portion 64 achieves about twenty microhenries of inductance.

Switching devices S1 and S2 switch at a relatively higher frequency than switching devices that are not silicon-carbide based, such as pure silicon IGBTs or MOSFETs. The higher speed switching devices minimizes inductance required for the desired current ripple, thus making the required inductance more achievable with the inductor portion 64 of the cable 52.

Features of the example disclosure include providing an inductor with a cable rather than incorporating a separate inductor into a variable voltage converter or power control system of an electrified machine.

Eliminating a separate inductor within a variable voltage controller or another portion of the power control system can reduce the overall size and cost of the variable voltage controller, and can improve efficiency. Further, a magnetic core for an inductor is not required.

Further, when silicon carbide switching devices are used, the total silicon carbide chip area can be reduced due to the high temperature operational capability of silicone carbide devices. Reducing the total chip area can reduce costs associated with the variable voltage controller.

The air-cooled inductor portion 64 facilitates running switching devices of the power control system at a cooler temperature because inductor heat does not need to be dissipated into a coolant loop for the switching devices. The air-cooled inductor portion 64 does not realize iron core losses.

In addition, the current capability of the cables 52 can be increased over the current capability of the existing inductor designs since the primary limiting factor of the cables 52 with inductor portions 64 is heat of the conductor 82, rather than heat of both the conductor and a magnetic core.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An electrified vehicle assembly, comprising:
an inner sheath providing an open area; and
a cable connected to an electrified vehicle battery, the cable having a coiled portion providing an inductor, the coiled portion wound around the open area, wherein the open area provides an air core for the inductor, wherein the inner sheath is configured to communicate a flow of air to cool the inductor, wherein the coiled portion and the inner sheath are received within a rocker of an electrified vehicle.

2. The assembly of claim 1, further comprising an outer sheath, the inner sheath and coiled portion received within the outer sheath.

3. The assembly of claim 2, wherein the outer sheath and the inner sheath are both polymer materials.

4. The assembly of claim 1, further comprising a power control system of an electrified vehicle powertrain, the cable electrically coupling the electrified vehicle battery to the power control system, wherein the power control system comprises a variable voltage controller that includes at least one silicon-carbide based switch.

5. The assembly of claim 4, wherein the at least one silicon-carbide based switch comprises at least one metal-oxide-semiconductor field-effect transistor.

6. The assembly of claim 1, wherein the coiled portion includes from 40 to 240 individual coils.

7. The assembly of claim 1, wherein the coiled portion includes a plurality of individual coils that are spaced from 15 to 55 millimeters from each other.

8. The assembly of claim 1, wherein the inner sheath is a polymer material.

9. The assembly of claim 1, wherein the inner sheath has a rectangular cross-sectional profile, and the coiled portion includes coils that directly contact the inner sheath at corners of the rectangular cross-sectional profile, the coil spaced from other areas of the rectangular cross-sectional profile to provide a gap between the coil and the inner sheath on each side of the rectangular cross-sectional profile.

10. A method of electrified vehicle power conversion, comprising:
winding an inductor portion of a cable around an inner sheath providing an open area;
communicating electric current between an electrified vehicle battery and a power control system with the cable;
resisting changes in the electric current using the inductor portion of the cable; and
air-cooling the inductor portion by communicating air through the open area of the inner sheath;
positioning at least a portion of the inductor portion and at least a portion of the inner sheath within an outer sheath; and
housing the inductor portion, the inner sheath, and the outer sheath within a rocker of an electrified vehicle.

11. The method of claim 10, communicating power from the cable through at least one silicon carbide switching device within the power control system.

12. The method of claim 10, wherein the electrified vehicle battery is positioned in a rear of an electrified vehicle, and the power control system is positioned in a forward portion of the electrified vehicle.

13. The method of claim 10, further comprising directly contacting the inner sheath and the outer sheath with a coil of the inductor portion.

14. The method of claim 10, wherein the outer sheath and the inner sheath are both polymer materials.

15. An electrified vehicle assembly, comprising:
an inner sheath providing an open area, the inner sheath a polymer material;
a cable connected to an electrified vehicle battery, the cable having a coiled portion providing an inductor, the coiled portion wound around the open area; and
a rocker of an electrified vehicle, the coiled portion and the inner sheath received within a rocker of an electrified vehicle, wherein the open area provides an air core for the inductor portion, and the inner sheath is configured to communicate a flow of air to cool the inductor portion.

\* \* \* \* \*